H. A. HARRAH.
DRIVING GEARING FOR TRACTORS.
APPLICATION FILED JUNE 24, 1918.
1,352,125.
Patented Sept. 7, 1920.
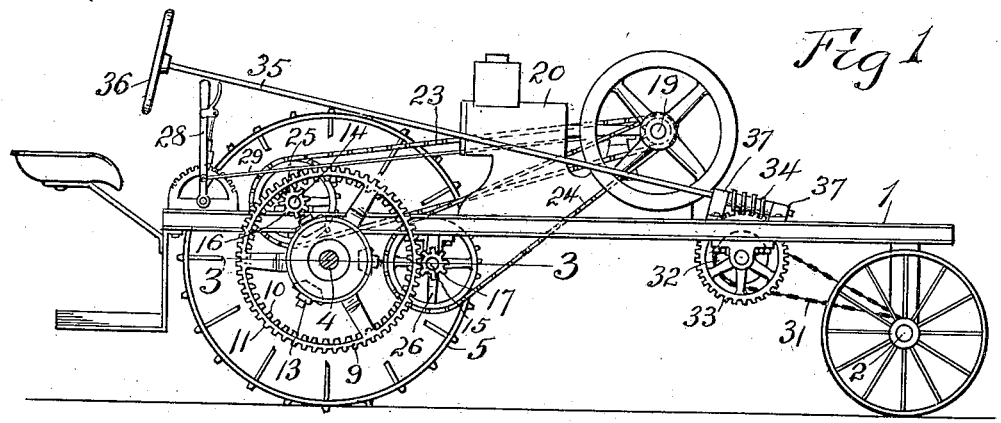
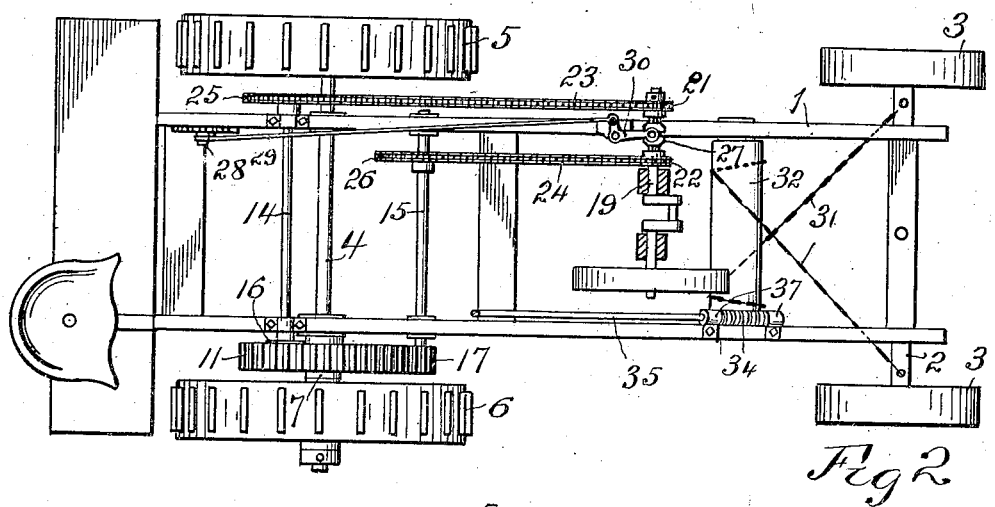
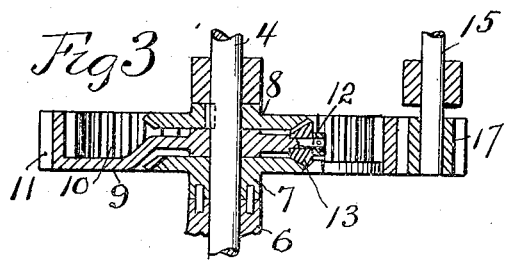
WITNESS
R. E. Hamilton
INVENTOR.
Hillis A. Harrah
BY
Warren D. House
His ATTORNEY

UNITED STATES PATENT OFFICE.

HILLIS A. HARRAH, OF KANSAS CITY, MISSOURI, ASSIGNOR OF ONE-HALF TO LIZZIE T. LEIMBACH, OF ROSEDALE, KANSAS.

DRIVING-GEARING FOR TRACTORS.

1,352,125.  Specification of Letters Patent.  Patented Sept. 7, 1920.

Application filed June 24, 1918. Serial No. 241,486.

*To all whom it may concern:*

Be it known that I, HILLIS A. HARRAH, a citizen of the United States, residing at Kansas City, in the county of Jackson and State of Missouri, have invented a certain new and useful Improvement in Driving-Gearing for Tractors, of which the following is a specification.

My invention relates to improvements in driving gearing for tractors.

The object of my invention is to provide novel reversing gearing for tractors which is simple in construction, which is strong and durable, which can be cheaply manufactured and not liable to get out of order and which is efficient in operation.

The novel features of my invention are hereinafter fully described and claimed.

In the accompanying drawing, which illustrates the preferred embodiment of my invention, Figure 1 is a side elevation of a tractor provided with my improvement, some of the parts being removed and others broken away.

Fig. 2 is a plan view of the same, with some of the parts removed and some broken away.

Fig. 3 is an enlarged horizontal section on the line 3—3 of Fig. 1.

Similar reference characters designate similar parts in the different views.

1 designates the horizontal frame of the tractor mounted on and pivoted in the usual manner to a front axle 2 having the usual carrying wheels 3.

4 designates a rotary rear axle which supports the frame 1 and which has secured to and is rotatable with a traction wheel 5. Rotatable on the axle 4 is a carrying wheel 6, to the inner end of the hub of which is secured a bevel gear wheel 7.

Adjacent to the bevel gear wheel 7 and keyed on the axle 4 is a bevel gear wheel 8.

Rotatable on the axle intermediate of the gear wheels 7 and 8 is a gear wheel 9 having an internal set of teeth 10 and an external set of teeth 11.

The gear wheel 9 is provided with radial arms 12 on which are respectively rotatably mounted bevel gear wheels 13, each of which meshes with the gear wheels 7 and 8.

Rotatable on the frame 1 are two transverse horizontal shafts 14 and 15 to which are respectively secured two pinions 16 and 17, which respectively mesh with the teeth 10 and 11 of the wheel 9.

For rotating the shafts 14 and 15 alternately in a like direction, I provide manually controlled mechanism comprising the following described elements. 19 designates the crank shaft of an ordinary explosive engine 20. Rotatable on the shaft 19 independently of each other are two sprocket wheels 21 and 22, which are respectively connected by chain belts 23 and 24 with two sprocket wheels 25 and 26, which are respectively secured to the shafts 14 and 15. Slidably splined on the shaft 19 and rotatable therewith is a friction clutch member 27, which is adapted to have its ends respectively frictionally engage with the adjacent ends of the sprocket wheels 21 and 22, for the purpose of rotating the latter.

The clutch member 27 may be alternately slid into driving engagement with the sprocket wheels 21 and 22 by means of a lever 28, which is pivoted to the frame 1, and which is connected by a rod 29 with a bell crank lever 30, which is pivoted on a vertical axis to the frame 1, and which operatively engages in the usual manner the clutch member 27.

Upon swinging the lever 28 forwardly, the clutch member 27 will be forced into driving engagement with the sprocket wheel 22. If the crank shaft 19 is now rotated counter-clockwise, as viewed in Fig. 1, the pinion 17 will be rotated in the same direction, through the intermediacy of the wheel 22, chain 24, sprocket wheel 26 and shaft 15. The gear wheel 9 will thus be turned in a clockwise direction, as viewed in Fig. 1, and the axle 4 and traction wheel 6 will be driven forwardly through the intermediacy of the gear wheel 9 and gear wheels 13, 7 and 8.

The tractor will thus be forwardly driven.

If it is desired to run the tractor backwardly, the lever 28 is swung rearwardly, thus sliding the clutch member 27 into engagement with the sprocket wheel 21.

If the engine shaft 19, as viewed in Fig. 1, is rotated counter-clockwise, the axle 4 and traction wheel 5 and also the traction wheel 6 will be rotated counter-clockwise through the intermediacy of the gear wheels 7, 8, 13 and 9, pinion 16, shaft 14, sprocket wheel 25, chain belt 23, sprocket wheel 21, and clutch member 27. The tractor will thus be driven rearwardly.

When the clutch member 27 is in the neutral position shown in Fig. 2, rotation will not be transmitted from the crank shaft 19 to the shafts 14 and 15.

When running forwardly down hill, the clutch member 27, if desired, may be shifted into driving engagement with the sprocket wheel 21, and permitted to slip during such engagement, thereby serving as a brake for the tractor.

Any suitable means may be employed to turn the tractor to right or left. For effecting this, I have shown in the drawing two crossed chains 31 secured at one set of ends to the axle 2 at opposite sides respectively of the pivotal point of said axle. The other set of ends of said chains are secured to the periphery of a horizontal transverse drum 32 rotatably mounted on the frame 1, and having secured to one of its ends a worm wheel 33, which meshes with a worm 34, which is secured on the forward end of a rearwardly extending shaft 35, which is provided at its rear end with a hand wheel 36, and which is rotatable in bearings 37 mounted on the frame 1.

I do not limit my invention to the structure shown and described, as modifications, within the scope of the appended claims, may be made without departing from the spirit of my invention.

What I claim is:—

1. In a tractor, two traction wheels, a gear wheel having external and internal teeth, means actuated by the gear wheel for driving said traction wheels, two pinions respectively meshing with said two sets of teeth, a driving shaft, and means actuated by the driving shaft for independently rotating said pinions in like directions.

2. In a tractor, two traction wheels, a gear wheel having external and internal teeth, means actuated by the gear wheel for driving said traction wheels, two rotary shafts, two pinions respectively secured to said shafts and respectively meshing with said two sets of teeth, and manually controlled means for alternately rotating said shafts in like directions.

3. In a tractor, two traction wheels, a gear wheel having external and internal teeth, means actuated by the gear wheel for driving said traction wheels, two rotary shafts, two pinions respectively secured to said shafts and respectively meshing with said two sets of teeth, a driving shaft, and means including a clutch by which said rotary shafts may be rotated alternately in like directions by the driving shaft.

4. In a tractor, two traction wheels, a gear wheel having external and internal teeth, means actuated by the gear wheel for driving said traction wheels, two rotary shafts, two pinions respectively secured to said shafts and respectively meshing with said two sets of teeth, two sprocket wheels respectively secured to said rotary shaft, a driving shaft, two sprocket wheels rotatable on the driving shaft, a clutch for alternately locking the last named sprocket wheels to the driving shaft, and two belts respectively connecting the sprocket wheels on the rotary shafts with the sprocket wheels on the driving shafts.

In testimony whereof I have signed my name to this specification.

HILLIS A. HARRAH.